(12) United States Patent
Kitajima et al.

(10) Patent No.: US 6,717,378 B2
(45) Date of Patent: Apr. 6, 2004

(54) MOTOR OUTPUT CONTROL SYSTEM AND METHOD FOR HYBRID VEHICLE

(75) Inventors: Shinichi Kitajima, Utsunomiya (JP); Atsushi Matsubara, Utsunomiya (JP); Teruo Wakashiro, Shioya-gun (JP); Toshinari Shinohara, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/310,947

(22) Filed: Dec. 6, 2002

(65) Prior Publication Data

US 2003/0107335 A1 Jun. 12, 2003

(30) Foreign Application Priority Data

Dec. 12, 2001 (JP) ........................................ 2001-379065

(51) Int. Cl.$^7$ ................................................ H02P 1/54
(52) U.S. Cl. ........................ 318/34; 318/445; 318/473
(58) Field of Search ................................ 318/445, 473, 318/34; 180/65.2; 701/43

(56) References Cited

U.S. PATENT DOCUMENTS 6,459,972 B2 * 10/2002 Kodaka et al. ............... 701/43
6,476,573 B2 * 11/2002 Omata et al. ............... 318/445

FOREIGN PATENT DOCUMENTS

JP          2001-61204          3/2001

* cited by examiner

Primary Examiner—Karen Masih
(74) Attorney, Agent, or Firm—Arent Fox PLLC

(57) ABSTRACT

A control system for preventing a sudden change in the passengers' feeling for the acceleration. After determining whether the assistance using the motor is permitted with respect to each of different control modes, an amount of assistance for each mode is calculated. If the output assistance is permitted in any mode, the maximum amount of assistance is selected, and a previous value of the maximum amount of assistance is compared with the current value of the maximum amount of assistance. A shift value is obtained by subtracting a predetermined assistance value from the previous value when the current value is less than the previous value, and the amount of assistance is set to the shift value until the shift value becomes equal to or less than the current value, so as to gradually shift the amount of assistance from the previous value to the current value.

5 Claims, 8 Drawing Sheets

MOTOR OUTPUT CONTROL SYSTEM AND METHOD FOR HYBRID VEHICLE

BACKGROUND OF THE INVENTION

1. Field of the Invention

The present invention relates to a control system and method for a hybrid vehicle driven by an engine and a motor, and in particular, relates to a technique for controlling the amount of power assistance when the output of the engine is assisted using the motor.

2. Description of the Related Art

Conventionally, hybrid vehicles employing an engine and a motor as driving sources are known. Among them, in parallel hybrid vehicles, the motor is used as an assistance driving source for assisting the output of the engine. More specifically, when such a parallel hybrid vehicle is accelerated, the engine output is assisted by driving the motor, and when decelerated, various controls, such as battery charging using deceleration regeneration, are performed so as to maintain necessary electrical energy of the battery (i.e., the necessary remaining charge) and also to satisfy the driver's intention.

In such hybrid vehicles, Japanese Unexamined Patent Application, First Publication No. 2001-61204 discloses an assistance control system for hybrid vehicles, in which the assistance mode, in which the output of the engine is assisted using the motor, is divided into a plurality of modes to which different control processes are assigned according to the driving state of the vehicle, and one of the modes is selected based on the motor output (i.e., the amount of power assistance) of each mode or the like.

In the above-explained conventional hybrid vehicles, when the amount of power assistance assigned to each mode (in the assistance mode) is considerably different (i.e., the difference between the amounts of assistance of different modes is great), the change in the amount of assistance at the mode change is great, so that passengers in the vehicle may feel that the acceleration has suddenly changed.

In particular, when the assistance mode is switched from a mode having a relatively small amount of power assistance to a mode having a relatively large amount of power assistance, a discontinuity (i.e., a sudden change) is produced in the torque, which the passengers have not anticipated, thereby degrading driving performance.

SUMMARY OF THE INVENTION

In consideration of the above circumstances, an object of the present invention is to provide a motor output control system and method effectively used when changing the assistance mode in which the output of the internal combustion engine is assisted by using the motor, so as to prevent a sudden change in the passengers' feeling for the acceleration and to secure smooth acceleration performance.

Therefore, the present invention provides a motor output control system built in a hybrid vehicle which comprises an internal combustion engine (e.g., an engine E in an embodiment explained below) and a motor (e.g., a motor M in the embodiment explained below) as driving sources and in which the output of the internal combustion engine is assisted using the motor according to the driving state of the vehicle, the system comprising:

- an assistance mode determination section (which may be provided in a motor ECU 1 in the embodiment explained below) for determining whether the output assistance using the motor is permitted with respect to each of different control modes for the output assistance, where the determination is performed according to the driving state of the vehicle;
- an amount of assistance calculating section (which may be provided in the motor ECU 1 in the embodiment explained below) for calculating an amount of output assistance for each of the different control modes (e.g., the starting assistance command value STRAST, the scramble assistance command value SCRAST, the WOT assistance command value WOTAST, and the ECO assistance command value ECOAST in the embodiment explained below);
- an assistance permitting section (which may be provided in the motor ECU 1 in the embodiment explained below) for permitting the output assistance using the motor when the output assistance is permitted in any control mode according to the determination of the assistance mode determination section;
- an amount of assistance selecting section (which may be provided in the motor ECU 1 in the embodiment explained below) for selecting the maximum amount of assistance among the amounts of assistance, which are calculated by the amount of assistance calculating section and are assigned to the different control modes, when the output assistance using the motor is permitted by the assistance permitting section; and
- a mode shift section (which may be provided in the motor ECU 1 in the embodiment explained below) for:
  - comparing a previous value of the maximum amount of assistance (e.g., the final acceleration assistance command value ACCASTF in the embodiment explained below), selected by the amount of assistance selecting section last time, with the current value (e.g., the acceleration assistance command value ACCAST in the embodiment explained below) of the maximum amount of assistance selected this time;
  - calculating a shift value (e.g., "ACCASTF−#DACCASTM" in the embodiment explained below) obtained by subtracting a predetermined assistance value (e.g., the predetermined assistance command subtraction value #DACCASTM in the embodiment explained below) from the previous value when the current value is less than the previous value; and
  - setting the amount of assistance using the motor to the shift value until the shift value becomes equal to or less than the current value, so as to gradually shift the amount of assistance from the previous value to the current value.

According to the above system, when the control mode for motor assistance is changed according to the driving state of the vehicle, if the amount of assistance selected this time is less than the amount of assistance selected last time, the mode shift section sets the amount of assistance of this time to a value obtained by subtracting a predetermined assistance value from the previous value.

That is, when the amount of assistance is changed according to a control mode change for the assistance, the mode shift section sets the amount of assistance in a manner such that the amount of assistance gradually shifts to the amount corresponding to a value assigned to the newly-selected control mode, without simply switching the amount of assistance from the previous value assigned to the previous mode to the newly-selected value. Accordingly, the amount of assistance can be smoothly changed, thereby preventing a sudden change in the feeling of acceleration of the passengers in the vehicle and securing smooth acceleration and driving performance.

The assistance permitting section may include the assistance mode determination section. That is, when the assistance permitting section determines whether the output assistance using the motor is performed (i.e., permitted), the assistance mode determination section determines whether the output assistance using the motor is permitted with respect to each of the different control modes for the output assistance, thereby selecting permittable control modes.

As a typical example, the control modes for the output assistance using the motor include at least:
- a starting assistance mode (e.g., the starting assistance in the embodiment explained below) for performing the output assistance when the vehicle is started;
- a sudden acceleration assistance mode (e.g., the scramble assistance in the embodiment explained below) for performing the output assistance when the vehicle is suddenly accelerated;
- a low load assistance mode (e.g., the ECO assistance in the embodiment explained below) for performing the output assistance when the load of the internal combustion engine is low; and
- a high load assistance mode (e.g., the WOT assistance in the embodiment explained below) for performing the output assistance when the load of the internal combustion engine is high.

Accordingly, the amount of power assistance can be gradually changed when the assistance mode is switched, for example:

(i) when the acceleration is performed after the mode is switched to the low load assistance mode, in which output assistance is performed in a low load state of the internal combustion engine, or to the high load assistance mode, in which output assistance is performed in a high load state of the internal combustion engine, after the starting assistance mode (in which the output assistance is performed when the vehicle is started) is terminated, or (ii) when acceleration is performed by switching the acceleration mode to the low load or high load assistance mode after termination of the sudden acceleration assistance mode in which the output assistance is temporarily performed when the vehicle is suddenly accelerated.

Therefore, when the control mode is changed, a sudden change in the feeling of acceleration of the passengers in the vehicle can be prevented, thereby securing smooth acceleration and driving performance.

The present invention also provides a motor output control method used for a hybrid vehicle which comprises an internal combustion engine and a motor as driving sources and in which the output of the internal combustion engine is assisted using the motor according to the driving state of the vehicle, the method comprising:
- an assistance mode determination step of determining whether the output assistance using the motor is permitted with respect to each of different control modes for the output assistance, where the determination is performed according to the driving state of the vehicle (refer to steps S104, S108, S109, S111, and S112 in an embodiment explained below);
- an amount of assistance calculating step of calculating an amount of output assistance for each of the different control modes (refer to steps S312 to S315 in the embodiment explained below);
- an assistance permitting step of permitting the output assistance using the motor when the output assistance is permitted in any control mode according to the determination in the assistance mode determination step (refer to steps S101 to S114 in the embodiment explained below);
- an amount of assistance selecting step of selecting the maximum amount of assistance among the amounts of assistance, which are calculated in the amount of assistance calculating step and are assigned to the different control modes, when the output assistance using the motor is permitted in the assistance permitting step (refer to steps S319 to S330 in the embodiment explained below); and
- a mode shift step (refer to steps S331 to S339 in the embodiment explained below) of:
  - comparing a previous value (e.g., the final acceleration assistance command value ACCASTF in the embodiment explained below) of the maximum amount of assistance, selected in the amount of assistance selecting step last time, with the current value (e.g., the acceleration assistance command value ACCAST in the embodiment explained below) of the maximum amount of assistance selected this time;
  - calculating a shift value (e.g., "ACCASTF−#DACCASTM" in the embodiment explained below) obtained by subtracting a predetermined assistance value (e.g., the predetermined assistance command subtraction value #DACCASTM in the embodiment explained below) from the previous value when the current value is less than the previous value; and
  - setting the amount of assistance using the motor to the shift value until the shift value becomes equal to or less than the current value, so as to gradually shift the amount of assistance from the previous value to the current value.

DESCRIPTION OF THE PREFERRED EMBODIMENTS

Hereinafter, embodiments according to the present invention will be explained with reference to the drawings.

Figure 1:
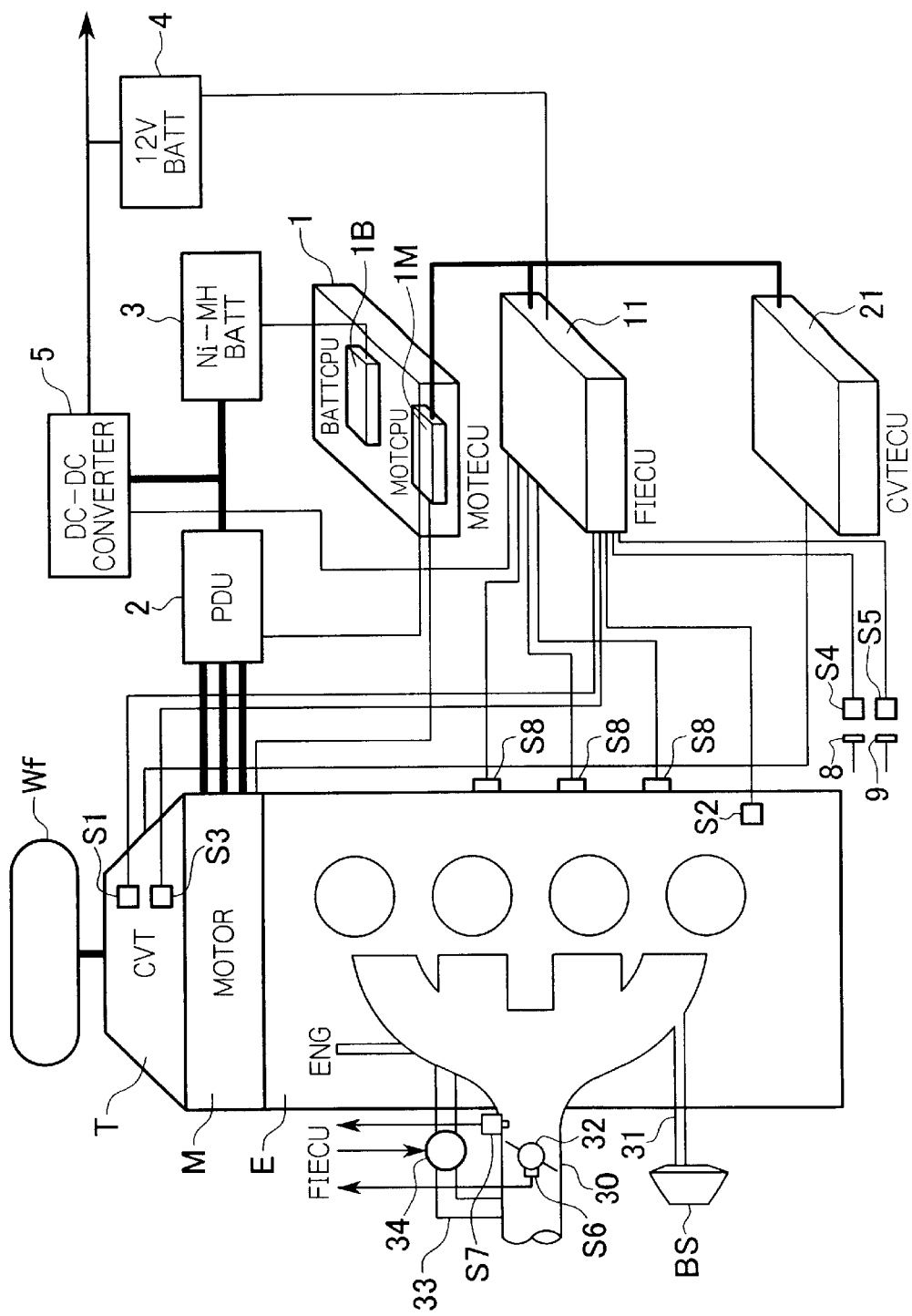
FIG. 1 shows the structure of a hybrid vehicle which includes a motor output control system as an embodiment of the present invention.

FIG. 1 shows the structure of a parallel hybrid vehicle which includes a motor output control system as an embodiment of the present invention. In the hybrid vehicle, an engine E (i.e., internal combustion engine), a motor M, and a transmission T are directly and serially coupled. The driving force produced by the engine E and the motor M is transmitted via the transmission T such as a CVT (continuously variable transmission) or a manual transmission to front wheels Wf which are driving wheels. When driving force is transmitted from the front wheels Wf to the motor M during deceleration of the hybrid vehicle, the motor M functions as a generator for generating a regenerative braking force, so that the kinetic energy of the vehicle body is stored as electrical energy. In FIG. 1, the relevant components of both a manual-transmission vehicle and a CVT vehicle are shown for convenience of explanation.

The driving and regenerating operations of the motor M are performed by a power drive unit (PDU) 2 which receives a control command signal from a motor CPU (central processing unit) 1M provided in a motor ECU (electronic control unit) 1. A high voltage NiH (nickel/hydrogen) battery 3 is connected to the PDU 2, where electrical energy is transmitted between the motor M and the NiH battery 3. As an example, the battery 3 includes a plurality of modules connected in series, and in each module, a plurality of cells are connected in series. The hybrid vehicle includes a 12-V auxiliary battery 4 for driving various accessories (or auxiliary devices). The auxiliary battery 4 is connected to the battery 3 via a DC-DC converter (called a "downverter") 5. The DC-DC converter 5, controlled by an FIECU 11, reduces the voltage from the battery 3 so as to charge the auxiliary battery 4. The motor ECU 1 has a battery CPU 1B for protecting the battery 3 and calculating the remaining charge of the battery 3. A CVT ECU 21 for controlling the transmission T (here, CVT) is connected to the transmission T.

The FIECU 11 controls, in addition to the motor ECU 1 and the DC-DC converter 5, a fuel supply amount controller (not shown) for controlling the amount of fuel supplied to the engine E, a starter motor (not shown), and ignition timing, etc. Therefore, the FIECU 11 receives (i) a signal from a speed sensor S1 for measuring the vehicle speed VP, (ii) a signal from an engine speed sensor S2 for measuring the engine speed NE, (iii) a signal from a shift position sensor S3 for detecting the shift position of the transmission T, (iv) a signal from a brake switch S4 for detecting operation of a brake pedal 8, (v) a signal from a clutch switch S5 for detecting the operation of a clutch pedal 9, (vi) a signal from a throttle opening-degree sensor S6 for measuring the degree of throttle (valve) opening TH of a throttle valve 32, (vii) a signal from an air-intake passage negative pressure sensor S7 for measuring the air-intake passage negative pressure, (viii) a signal from a knock sensor S8, and the like.

Reference symbol BS indicates a booster coupled with the brake pedal. The air-intake passage negative pressure sensor S7 and the throttle opening-degree sensor S6 are attached to an air-intake passage 30.

A second air passage 33 for connecting the upstream and downstream sides of the throttle valve 32 is attached to the air-intake passage 30, and a control valve 34 for opening and closing the second air passage 33 is attached to the second air passage 33. This second air passage 33 is provided for supplying a small quantity of air to the cylinders even when the throttle valve 32 is totally closed. The opening/closing operation of the control valve 34 is controlled according to a signal from the FIECU 11, where the signal is output based on the air-intake passage negative pressure measured by the air-intake passage negative pressure sensor S7.

Zoning of Remaining Battery Charge SOC

Below, zoning of the remaining battery charge SOC (state of charge) will be explained. The SOC of the battery 3 is calculated by referring to the voltage, discharged current, temperature, or the like of the battery, and this calculation is performed by the battery CPU 1B.

As an example of zoning, the following zones are defined: basic zone A for normal use of the battery (SOC 40% to 75%), zone B for provisional use of the battery (SOC 25% to 40%), and zone C of overdischarge (SOC 0% to 25%), and above the zone A, zone D of overcharge (SOC 75% or higher) is also defined.

The energy management mode corresponding to the zone A (for normal use) functions as a charge/discharge permission mode in which charging or discharging operation is at least permitted, and the energy management mode corresponding to the zone C (of overdischarge) functions as a discharge suppression mode in which charging operation is permitted and discharging operation is restricted.

Basic Motor Mode

Below, the operation of determining the basic motor mode, which designates the driving mode of the motor M, will be explained with reference to the flowcharts in FIGS. 2 and 3. The process of this flow is repeated at specific intervals by the motor ECU 1.

The basic motor modes are of the following four kinds: the idle mode, the idle stop mode, the deceleration mode, the cruise mode, and the acceleration mode.

In the idle mode, the fuel supply is restarted after the fuel-cut state, and the engine E is maintained in the idle state. In the idle stop mode, the engine is stopped under specific conditions, when the vehicle is stopped or the like. In the deceleration mode, regenerative braking using the motor M is performed. In the acceleration mode, the driving force of the engine E is assisted by the motor M. In the cruise mode, the motor M is not driven and the vehicle runs by the driving force generated by the engine E.

In the present embodiment, the hybrid vehicle is a CVT vehicle. However, the flowcharts, which will be explained below, also include steps relating to a vehicle employing a manual transmission (i.e., MT vehicle) based on the specification of the control system.

Figure 2:
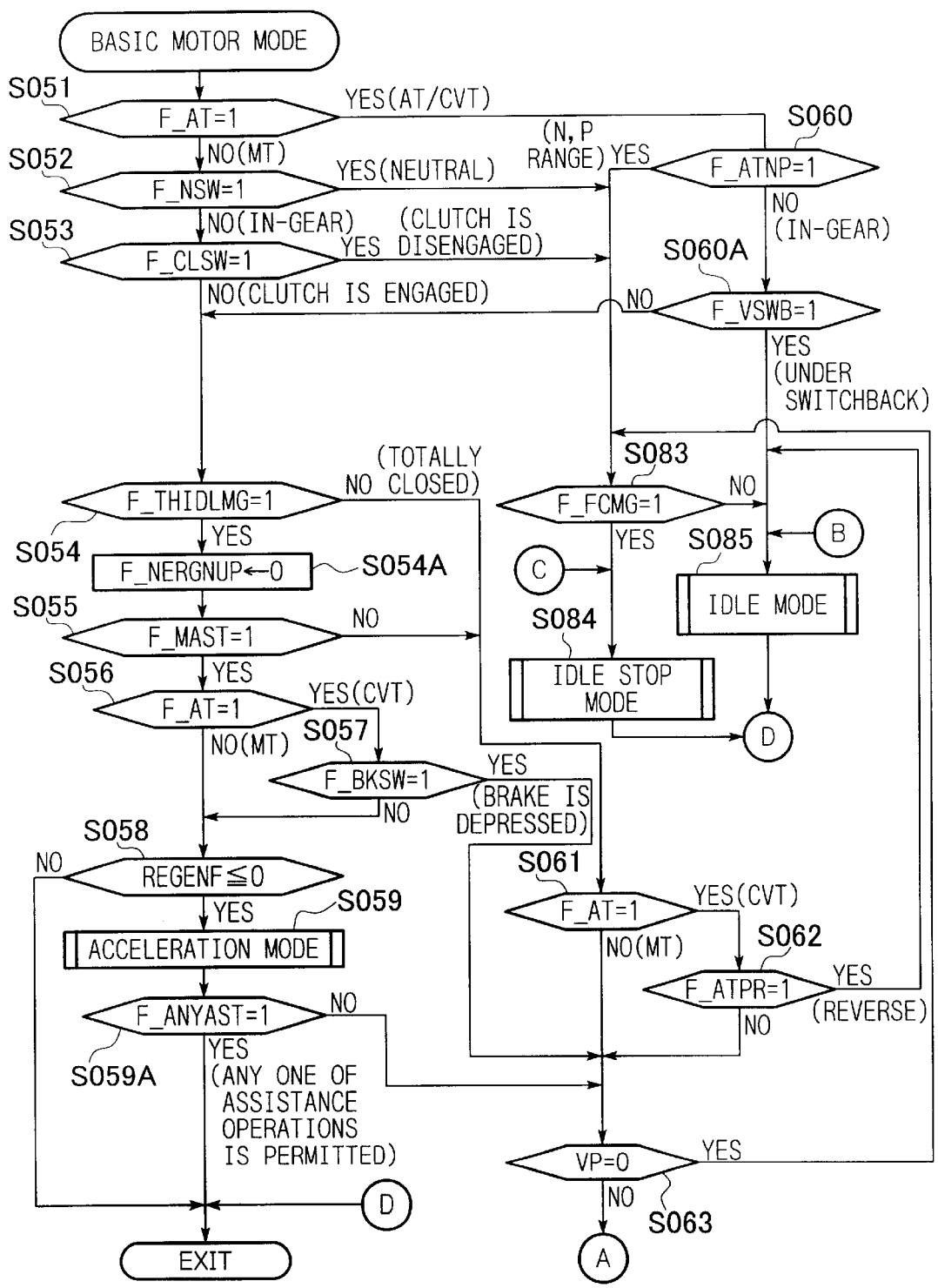
FIG. 2 is a flowchart of the operation of determining the basic motor mode.
Figure 3:
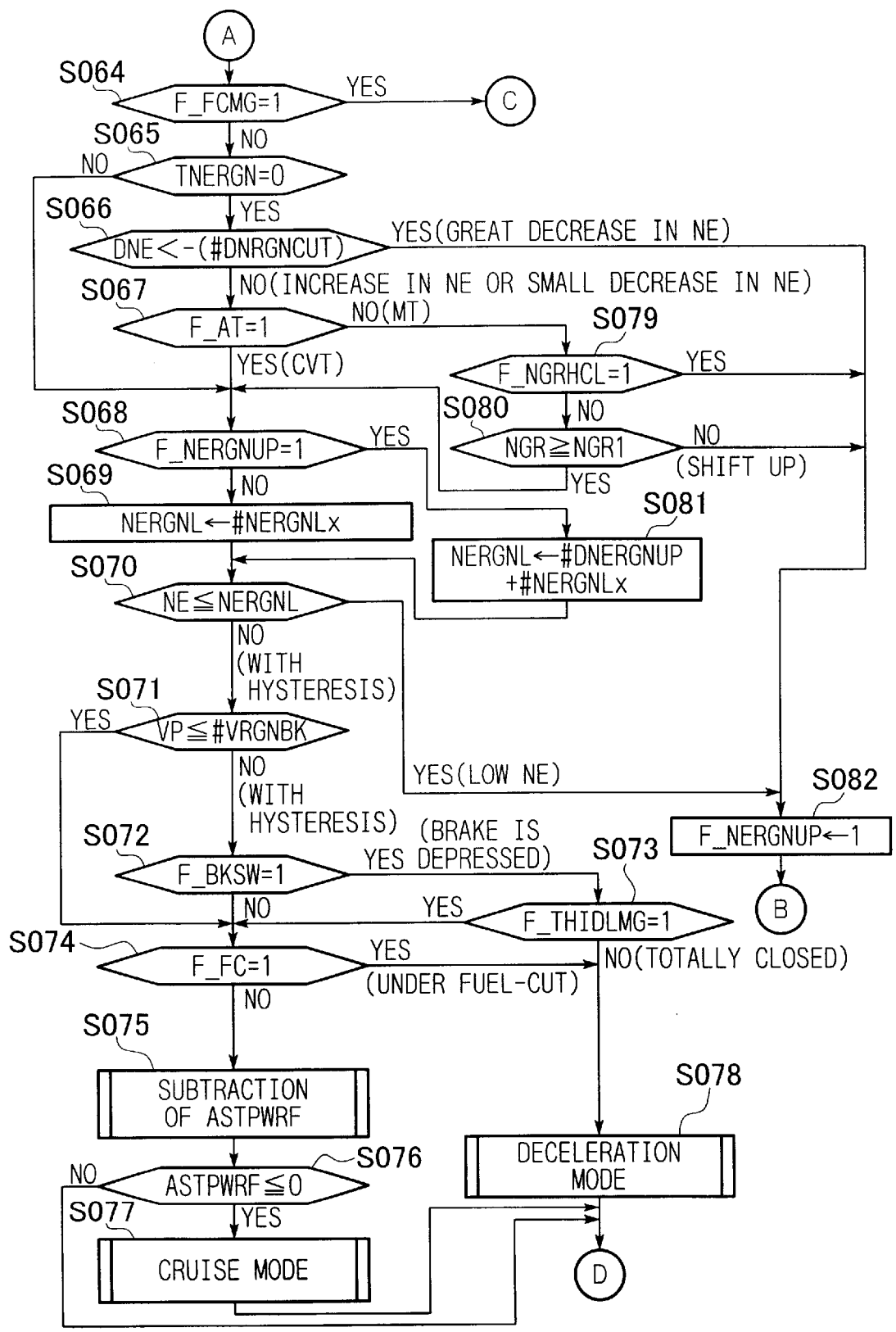
FIG. 3 is also a flowchart of the operation of determining the basic motor mode.

In the first step S051 in FIG. 2, it is determined whether the value of the MT/CVT determination flag F__AT is 1. If the result of the determination is "YES" (i.e., CVT vehicle), the operation proceeds to step S060, while if the result of the determination is "NO" (i.e., MT vehicle), the operation proceeds to step S052.

In step S060, it is determined whether the value of the CVT in-gear determination flag F__ATNP is 1. If the result of the determination is "YES" (i.e., N/P (neutral or parking) gear position), the operation proceeds to step S083, while if the result of the determination is "NO" (i.e., the vehicle is in the in-gear state), the operation proceeds to step S060A.

In step S060A, it is determined whether the value of the switchback flag F__VSWB is 1, so as to determine whether the vehicle is under the switchback operation in which the shift lever is operated by the driver at the present moment and thus the shift position cannot be determined. If the result of the determination of step S060A is "YES" (i.e., under switchback), the operation proceeds to step S085, where the basic motor mode is shifted to the idle mode and the control of this flow is terminated. In the idle mode, the engine E is maintained in the idle state.

If the result of the determination of step S060A is "NO" (i.e., switchback is not executed), the operation proceeds to step S054.

In step S083, it is determined whether the value of the engine stop control execution flag F__FCMG is 1. If the result of the determination is "NO", the operation proceeds to step S085, where the basic motor mode is shifted to the idle mode and the control is terminated. If the result of the determination is "YES", the operation proceeds to step S084, where the basic motor mode is shifted to the idle stop mode and the control is terminated. In the idle stop mode, the engine is stopped under specific conditions when the vehicle is stopped or the like.

In step S052, it is determined whether the value of the neutral position determination flag F_NSW is 1. If the result of the determination is "YES" (i.e., neutral), the operation proceeds to step S083, while if the result of the determination is "NO" (i.e., in-gear state), the operation proceeds to step S053.

In step S053, it is determined whether the value of the clutch engagement determination flag F_CLSW is 1. If the result of the determination is "YES" (i.e., clutch is disengaged), the operation proceeds to step S083, while if the result of the determination is "NO" (i.e., clutch is engaged), the operation proceeds to step S054.

In step S054, it is determined whether the value of the idle state determination flag F_THIDLMG is 1. If the result of the determination is "NO" (in this case, the throttle valve is totally closed), the operation proceeds to step S061, while if the result of the determination is "YES" (in this case, the throttle valve is not totally closed), the operation proceeds to step S054A.

In step S054A, the value of the engine speed increasing flag F_NERGNUP is set to 0, where this flag is used when it is determined that the clutch is half engaged (i.e., the clutch is halfway in). The operation then proceeds to step S055.

In step S055, it is determined whether the value of the motor assistance determination flag F_MAST is 1. This flag is referred to so as to determine whether the output of the engine E should be assisted by using the motor M. Therefore, the value "1" of the flag indicates that a request for assistance has been issued, while the value "0" indicates that no request for assistance has been issued. This motor assistance determination flag F_MAST is set in the assistance trigger determination process.

If the result of the determination in step S055 is "NO", the operation proceeds to step S061, while if the result of the determination is "YES", the operation proceeds to step S056.

In step S056, it is determined whether the value of the MT/CVT determination flag F_AT is 1. If the result of the determination is "YES" (i.e., CVT vehicle), the operation proceeds to step S057, while if the result of the determination is "NO" (i.e., MT vehicle), the operation proceeds to step S058.

In step S057, it is determined whether the value of the brake ON determination flag F_BKSW is 1. If the result of the determination is "YES" (i.e., the brake is depressed), the operation proceeds to step S063, while if the result of the determination is "NO" (i.e., the brake is not depressed), the operation proceeds to step S058.

In step S058, it is determined whether the value of the final charge command value REGENF is 0 or less. If the result of the determination is "YES", the acceleration mode is selected in step S059. In the acceleration mode, the output of the engine E is assisted by using the motor M, and the operation proceeds to step S059A. If the result of the determination in step S058 is "NO", the control is terminated.

In step S059A, it is determined whether the value of the assistance execution permitting flag F_ANYAST is 1. If the result of the determination is "YES", that is, when any one of assistance operations (explained below) is permitted, the control of this flow is terminated. If the result of the determination is "NO", the operation proceeds to step S063.

In step S061, it is determined whether the value of the MT/CVT determination flag F_AT is 1. If the result of the determination is "NO" (i.e., MT vehicle), the operation proceeds to step S063, while if the result of the determination is "YES" (i.e., CVT vehicle), the operation proceeds to step S062.

In step S062, it is determined whether the value of the reverse position determination flag F_ATPR is 1. If the result of the determination is "YES" (i.e., reverse position), the operation proceeds to step S085, while if the result of the determination is "NO" (i.e., any position other than the reverse position), the operation proceeds to step S063.

In step S063, it is determined whether the vehicle speed VP is 0. If the result of the determination is "YES", the operation proceeds to step S083, while if the result of the determination is "NO", the operation proceeds to step S064.

In step S064 (see FIG. 3), it is determined whether the value of the engine stop control execution flag F_FCMG is 1. If the result of the determination is "NO", the operation proceeds to step S065, while if the result of the determination is "YES", the operation proceeds to step S084.

In step S065, it is determined whether the timer value of the delay timer TNERGN is 0, where this timer is referred to, so as to determine the forcible release of regeneration at shift change. If the result of the determination is "YES", the operation proceeds to step S066, while if the result of the determination is "NO", the operation proceeds to step S068.

In step S066, it is determined whether the rate of change DNE of the engine speed is smaller than the negative value of a specific rate of change #DNRGNCUT (used in determination which does not consider regeneration). That is, #DNRGNCUT is used for determining whether the amount of power generation should be decreased based on the rate of change DNE of the engine speed.

If the result of the determination in step S066 is "YES", that is, if it is determined that the engine speed NE has considerably decreased (i.e., the rate of decrease is great), the operation proceeds to step S082. In step S082, the value of the engine speed increasing flag F_NERGNUP (referred to when the clutch is half engaged) is set to 1, the operation proceeds to step S085.

If the result of the determination in step S066 is "NO", that is, when the engine speed NE has increased or the rate of decrease of the engine speed NE is small, the operation proceeds to step S067.

In step S067, it is determined whether the value of the MT/CVT determination flag F_AT is 1. If the result of the determination is "NO" (i.e., MT vehicle), the operation proceeds to step S079, while if the result of the determination is "YES" (i.e., CVT vehicle), the operation proceeds to step S068.

In step S079, it is determined whether the value of the flag F_NGRHCL is 1, where this flag is referred to, so as to determine whether the clutch is half engaged (i.e., the clutch is halfway in). If the result of the determination is "YES", that is, it is determined that the clutch is half engaged, the operation proceeds to step S082. If the result of the determination is "NO", that is, it is not determined that the clutch is half engaged, the operation proceeds to step S080.

In step S080, the previous gear position NGR (i.e., the gear position determined last time) is compared with the current gear position NGR1, that is, it is determined whether NGR is equal to or greater than NGR1, so as to determine whether the shift-up operation for shifting the gear position to a higher position has been performed. If the result of the determination is "NO" (i.e., the gear position has been shifted up), the operation proceeds to step S082. If the result of the determination is "YES" (i.e., the gear position has not been shifted up), the operation proceeds to step S068.

In step S068, it is determined whether the value of the engine speed increasing flag F_NERGNUP (referred to when it is determined that the clutch is half engaged) is 1. If the result of the determination is "YES", that is, when the engine speed should be increased while the clutch is half engaged, then the operation proceeds to step S081. In step S081, the engine speed lower-limit value #NERGNLx, which is assigned to each gear position for the charging operation, and the additional engine speed value #DNERGNUP, which is used for preventing hunting, are added up, and the engine speed lower-limit value NERGNL, defined for the charging operation, is set to the added value (i.e., added result). The operation then proceeds to step S070.

If the result of the determination in step S068 is "NO", that is, it is unnecessary to increase the engine speed while the clutch is half engaged, then the operation proceeds to step S069. In step S069, the engine speed lower-limit value NERGNL, defined for the charging operation, is set to the engine speed lower-limit value #NERGNLx assigned to each gear position. The operation then proceeds to step S070.

The engine speed lower-limit value #NERGNLx assigned to each gear position is retrieved from a data table which stores the engine speed lower-limit values in correspondence to different gear positions.

In step S070, it is determined whether the engine speed NE is equal to or lower than the engine speed lower-limit value NERGNL for the charging operation. If the result of the determination is "YES", that is, the engine speed is low (i.e., NE≦NERGNL), the operation proceeds to step S082. If the result of the determination is "NO", that is, the engine speed is high (i.e., NE>NERGNL), the operation proceeds to step S071.

In step S071, it is determined whether the vehicle speed VP is equal to or lower than the lower-limit vehicle speed #VRGNBK, where #VRGNBK is referred to in the brake determination in the deceleration mode and this value has hysteresis. If the result of the determination is "YES", that is, when vehicle speed VP≦lower-limit vehicle speed #VRGNBK, the operation proceeds to step S074. If the result of the determination of step S071 is "NO", that is, when vehicle speed VP>lower-limit vehicle speed #VRGNBK, the operation proceeds to step S072.

In step S072, it is determined whether the value of the brake ON determination flag F_BKSW is 1. If the result of the determination is "YES", the operation proceeds to step S073, while if the result of the determination is "NO", the operation proceeds to step S074.

In step S073, it is determined whether the value of the idle state determination flag F_THIDLMG is 1. If the result of the determination is "NO" (i.e., the throttle valve is totally closed), the operation proceeds to step S078, where the deceleration mode is selected as the basic motor mode, and the control is terminated. In the deceleration mode, regenerative braking is performed using the motor M.

If the result of the determination in step S073, the operation proceeds to step S074.

In step S074, it is determined whether the value of the fuel cut flag F_FC is 1. This is the fuel-cut determination flag which has a value of 1 while the regeneration using the motor M is performed in the deceleration mode (in step S078), so as to perform the fuel-cut operation. If the result of the determination of step S074 is "YES" (i.e., under fuel cut in deceleration), the operation proceeds to step S078, while if the result of the determination is "NO" (i.e., fuel cut is not executed), the operation proceeds to step S075.

In step S075, the subtraction process for the final assistance command value ASTPWRF is performed (i.e., a process of subtracting a value from the final command value for assistance), and the operation proceeds to step S076.

In step S076, it is determined whether the final assistance command value ASTPWRF is 0 or less. If the result of the determination is "YES", the operation proceeds to step S077, where the cruise mode is selected as the basic motor mode, and the control is terminated. In the cruise mode, the motor M is not driven and the vehicle is running using the driving force generated by the engine E. In addition, according to the driving condition of the vehicle, regeneration may be performed using the motor M, or the motor M may be used as the generator so as to charge the battery 3. If the result of the determination of step S076 is "NO", the control is terminated.

Assistance Trigger Determination

Figure 4:
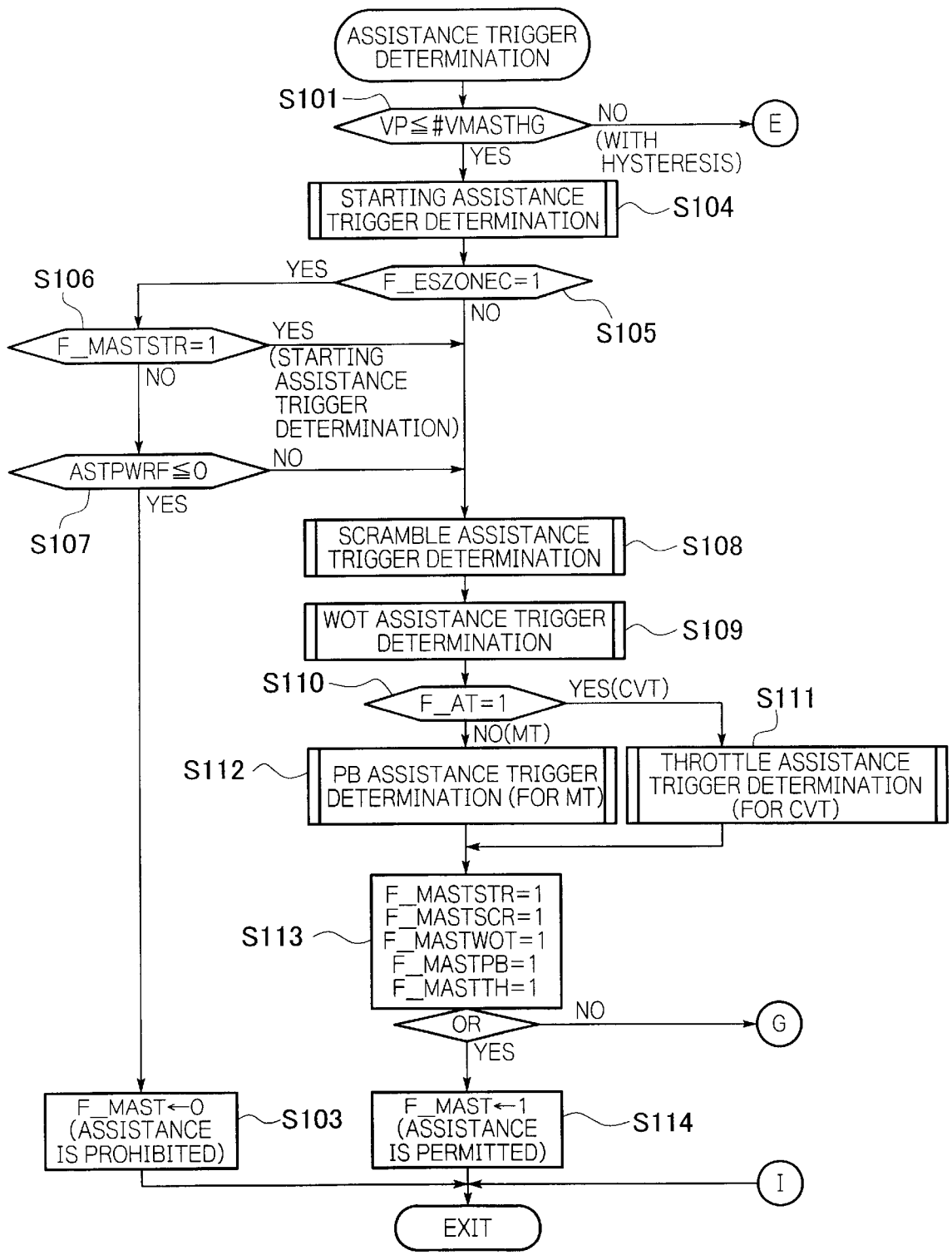
FIG. 4 is a flowchart of the assistance trigger determination process.
Figure 5:
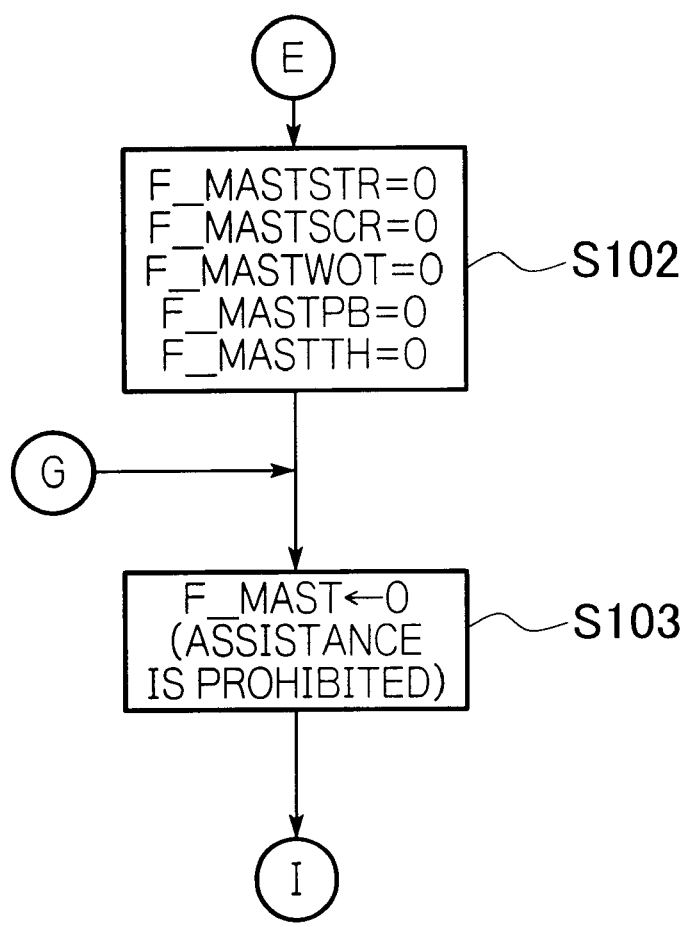
FIG. 5 is also a flowchart of the assistance trigger determination process.

Below, the assistance trigger determination process for setting the motor assistance determination flag F_MAST (see step S055) will be explained with reference to FIGS. 4 and 5. More specifically, this process is performed for determining the assistance or cruise mode according to specific regions for determination. FIGS. 4 and 5 show the flowchart for the assistance trigger determination process.

In the first step S101 in FIG. 4, it is determined whether the vehicle speed VP is equal to or lower than the assistance trigger search upper-limit vehicle speed #VMASTHG, where #VMASTHG is predetermined and has hysteresis.

If the result of the determination of step S101 is "NO", the operation proceeds to step S102 in FIG. 5, where the values of the starting motor-assistance determining flag F_MASTSTR, the scramble motor-assistance determining flag F_MASTSCR, the WOT motor-assistance determining flag F_MASTWOT (the meaning of "WOT" will be explained below), the air-intake passage negative pressure motor-assistance determining flag F_MASTPB, and the throttle motor-assistance determining flag F_MASTTH are each set to 0.

The operation proceeds to step S103, where the value of the motor-assistance determining flag F_MAST is set to 0, and the process of this flow is terminated.

If the result of the determination of step S101 is "YES", the operation proceeds to step S104, where the staring assistance-trigger determination process is performed. This process is performed for improving the starting performance of the vehicle, and in the process, the value of the starting motor-assistance determining flag F_MASTSTR is set, where this flag is provided for determining whether the output of the engine is assisted when the vehicle is started, and typically when the absolute value PBGA of the air-intake passage negative pressure PBG is equal to or higher than a specific level (i.e., in a high load state).

The operation then proceeds to step S105, in which it is determined whether the value of the energy storage zone C flag F_ESZONEC is 1. If the result of the determination is "YES", that is, it is determined that the remaining battery charge SOC (state of charge) is within the above-explained zone C, the operation proceeds to step S106. If the result of the determination is "NO", the operation proceeds to step S108 (explained below).

In step S106, it is determined whether the value of the starting motor-assistance determining flag F_MASTSTR (for determining whether the output of the engine is assisted) is 1. If the result of the determination is "YES", that is, when the starting assistance trigger is established, the operation proceeds to step S108 (explained below). If the result of the determination of step S106 is "NO", the operation proceeds to step S107.

In step S107, it is determined whether the final assistance command value ASTPWRF is 0 or less. If the result of the determination is "YES", the operation proceeds to the above-explained step S103, while if the result of the determination is "NO", the operation proceeds to step S108.

In step S108, the scramble assistance-trigger determination process is performed. In this process, the value of the scramble motor-assistance determining flag F_MASTSCR is set, where this flag is provided for determining whether the feeling of acceleration (of the passengers) is improved by temporarily increasing the amount of power assistance while the vehicle is accelerated under specific conditions, for example, when the rate of change DTHEM of the degree of throttle opening is equal to or greater than the predetermined rate of change #DTHSCAST.

In the next step S109, the WOT assistance trigger determination process is performed. This process relates to the control (called the WOT control) for increasing the output of the engine E by increasing the amount of fuel, supplied to the engine E, by an amount defined by the full-open fuel increase coefficient KWOT. In the process, the value of the WOT motor assistance determination flag F_MASTWOT is set, where this flag is provided for determining whether the engine E should be assisted in the WOT control.

In the following step S110, it is determined whether the value of the MT/CVT determination flag F_AT is 1. If the result of the determination is "YES" (i.e., CVT vehicle), the operation proceeds to step S111, where the throttle assistance trigger determination process is performed. In the process, the value of the throttle motor assistance determination flag F_MASTTH is set, where this flag is provided for determining whether the engine E should be assisted, based on the degree of throttle opening TH. The operation then proceeds to step S113.

If the result of the determination of step S110 is "NO" (i.e., MT vehicle), the operation proceeds to step S112, where the PB (i.e., air-intake passage negative pressure) assistance trigger determination process is performed. In this process, the value of the motor assistance determination flag F_MASTPB with respect to the air-intake passage negative pressure is set, where this flag is used for determining whether the engine E should be assisted, based on the air-intake passage negative pressure PB. The operation then proceeds to step S113.

In step S113, it is determined whether any of the starting motor-assistance determining flag F_MASTSTR, the scramble motor-assistance determining flag F_MASTSCR, the WOT motor-assistance determining flag F_MASTWOT, the air-intake passage negative pressure motor-assistance determining flag F_MASTPB, and the throttle motor-assistance determining flag F_MASTTH has a value of 1.

If the result of the determination is "NO", the operation proceeds to step S103, while if the result of the determination is "YES", the operation proceeds to step S114.

In step S114, the value of the motor assistance determination flag F_MAST is set to 1, thereby setting the assistance permission. The control of this flow is then completed.

Acceleration Mode

Figure 6:
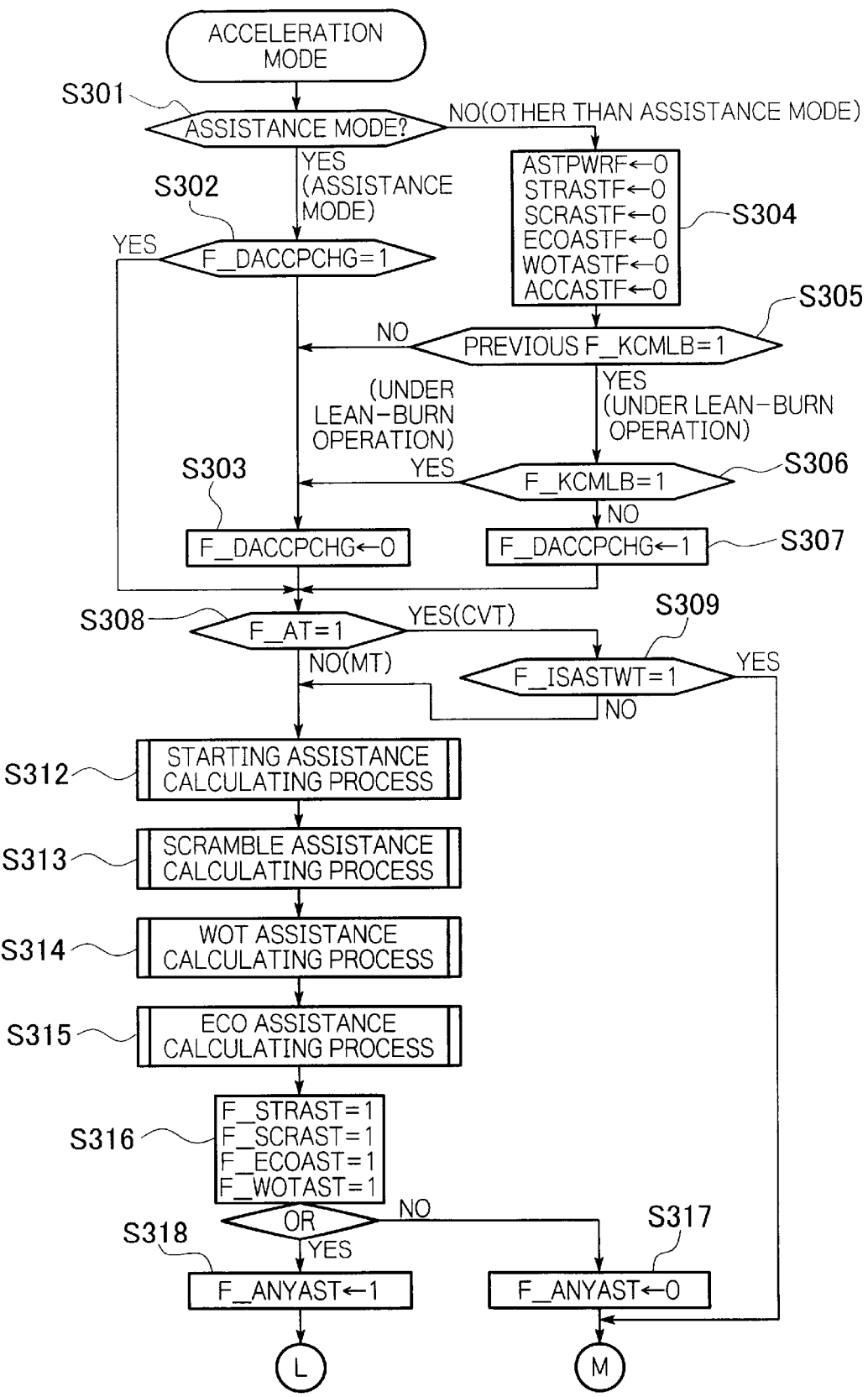
FIG. 6 is a flowchart of the process performed in the acceleration mode.
Figure 7:
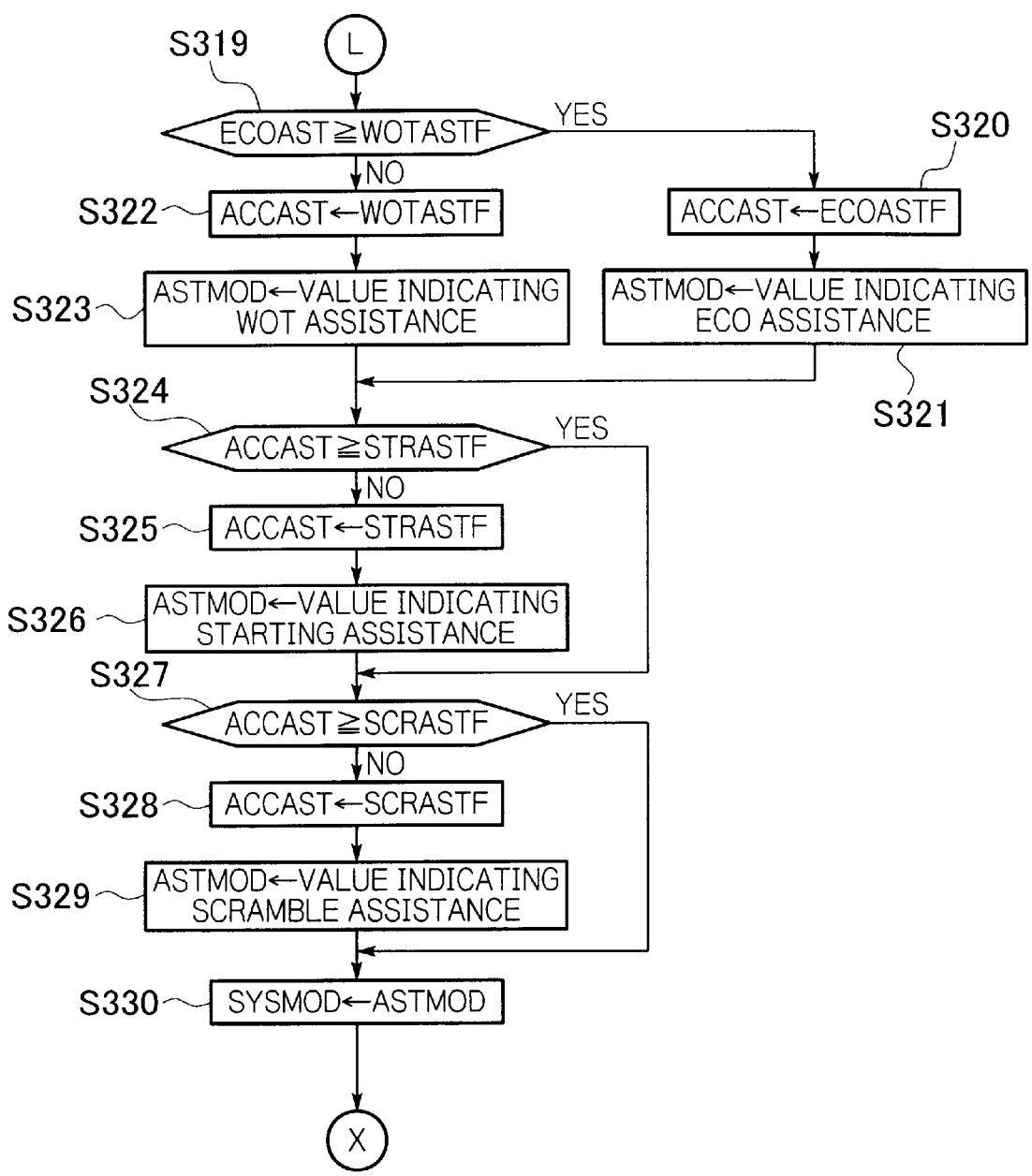
FIG. 7 is also a flowchart of the process performed in the acceleration mode.
Figure 8:
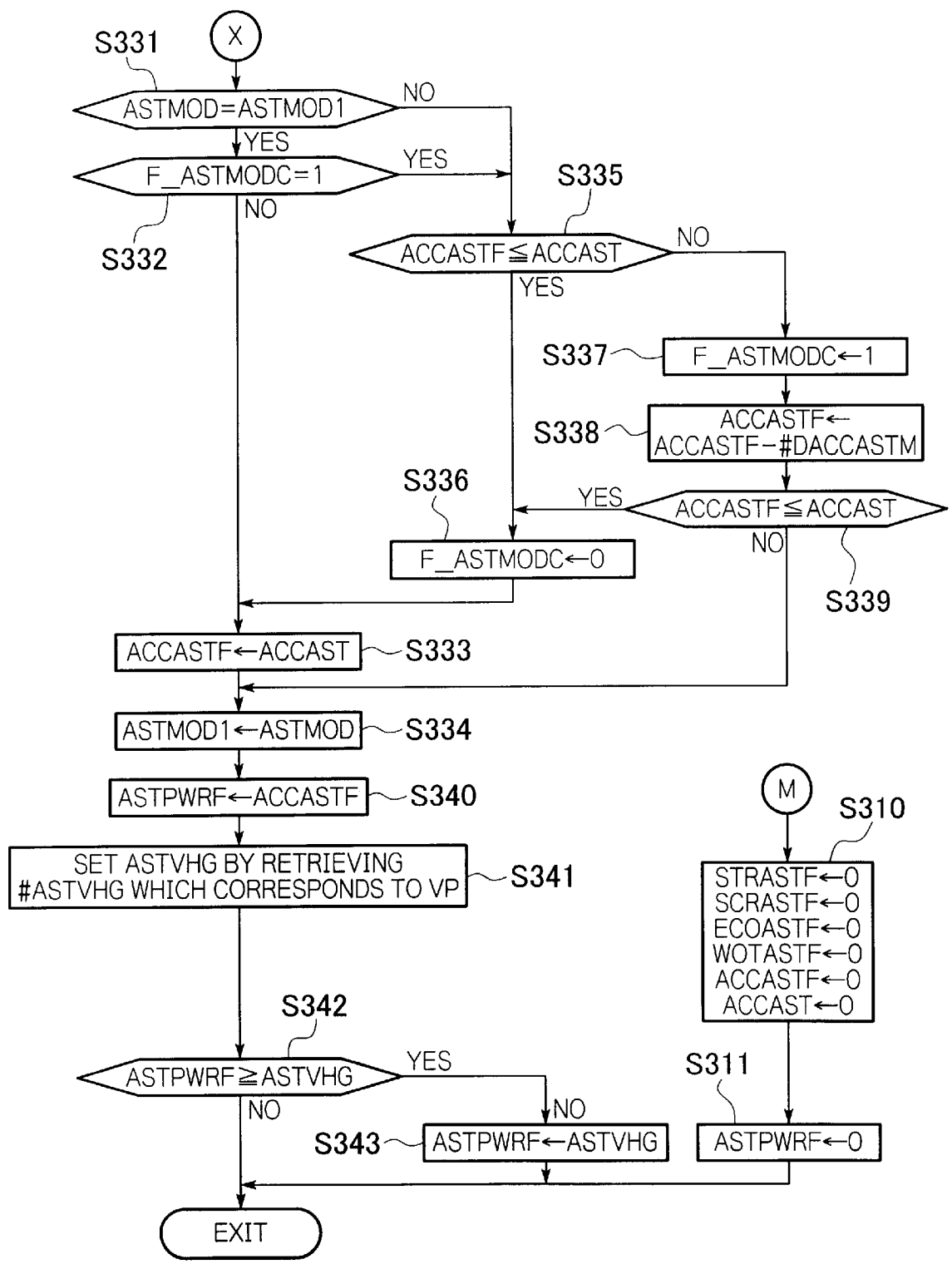
FIG. 8 is also a flowchart of the process performed in the acceleration mode.

Below, the process performed in the acceleration mode (see the above-explained step S059) will be explained with reference to the drawings. In this process, a plurality of amounts of power assistance are compared with each other, so as to select and output the optimum mode. FIGS. 6 to 8 are flowcharts relating to the acceleration mode.

In the first step S301 in FIG. 6, it is determined whether it is the assistance mode, that is, whether the output of the engine E is assisted in the acceleration mode. If the result of the determination is "YES" (i.e., assistance mode), the operation proceeds to step S302, while if the result of the determination is "NO" (other modes in which assistance is not performed), the operation proceeds to step S304 (explained below).

In step S302, it is determined whether the value of the assistance establishment recognition flag F_DACCPCH is 1. When the assistance is established due to switching from the combustion based on the theoretical (or stoichiometric) mixture ratio to the lean burn combustion, the driver may feel a sudden change in the engine output. That is, the assistance establishment recognition flag F_DACCPCH is used when the air-fuel ratio is changed, so as to prevent such a sudden change in the driver's feeling.

If the result of the determination of step S302 is "YES", the operation proceeds to step S308. If the result of the determination is "NO", the operation proceeds to step S303, where the value of the assistance establishment recognition flag F_DACCPCH is set to 0, and the operation proceeds to step S308.

In step S304, the final assistance command value ASTPWRF, the final starting assistance command value STRASTF, the final scramble assistance command value SCRASTF, the final ECO assistance command value ECOASTF (the ECO assistance will be explained below), the final WOT assistance command value WOTASTF, and the final acceleration assistance command value ACCASTF are each set to 0.

In step S305, it is determined whether the previous value of the lean-burn determination flag F_KCMLB (i.e., the flag value detected when the process was executed last time) is 1. If the result of the determination is "NO", the operation proceeds to step S303. If the result of the determination is "YES" (i.e., under lean-burn operation), the operation proceeds to step S306.

In step S306, it is determined whether the value of the lean-burn determination flag F_KCMLB is 1. If the result of the determination is "YES", that is, when the lean-burn operation has been continued, the operation proceeds to the above-explained step S303. If the result of the determination of step S306 is "NO", that is, the combustion has been switched from the lean-burn combustion to the combustion based on the theoretical mixture ratio, then the operation proceeds to step S307. In step S307, the value of the assistance establishment recognition flag F_DACCPCHG (used when the air-fuel ratio is switched) is set to 1, and the operation proceeds to step S308.

In step S308, it is determined whether the value of the MT/CVT determination flag F_AT is 1. If the result of the determination is "YES" (i.e., CVT vehicle), the operation proceeds to step S309, where it is determined whether the value of the flag F_ISASTWT is 1, where this flag is used for requesting the assistance standby state when the vehicle is started from the idle-stop mode.

If the result of the determination of step S309 is "YES", the operation proceeds to step S310, where the final starting assistance command value STRASTF, the final scramble assistance command value SCRASTF, the final ECO assistance command value ECOASTF, the final WOT assistance command value WOTASTF, the final acceleration assistance command value ACCASTF, and the acceleration assistance command value ACCAST are each set to 0. The operation proceeds to step S311, where the final assistance command value ASTPWRF is set to 0, and the process of this flow is terminated.

If the result of the determination in step S308 is "NO" (i.e., MT vehicle), or if the result of the determination in the above step S309 is "NO", the operation proceeds to step S312.

In step S312, the starting assistance calculating process is performed, in which the final staring assistance command value STRASTF is calculated as the amount of (power) assistance when the vehicle is started while the absolute value PBGA of the air-intake passage negative pressure PBG is equal to or higher than a predetermined level (i.e., in a high load state).

If the vehicle is an MT vehicle, the amount of assistance is calculated based on the absolute value PBGA of the air-intake passage negative pressure PBG. If the vehicle is a CVT vehicle, the amount of assistance is calculated based on the current value THEM of the degree of throttle opening.

In addition, if the value of the starting motor-assistance determining flag F_MASTSTR is 1, that is, when the starting assistance is requested, the value of the starting assistance flag F_STRAST is set to 1.

In the next step S313, the scramble assistance calculating process is performed. In this process, the final scramble assistance command value SCRASTF is calculated as the amount of assistance used for temporarily increasing the amount of assistance under specific conditions, typically when the rate of change DTHEM of the degree of throttle opening is equal to or higher than the predetermined rate of change #DTHSCAST.

If the vehicle is an MT vehicle, the amount of assistance is calculated based on the control engine speed NEAST (for control use) defined for each selected gear. If the vehicle is a CVT vehicle, the amount of assistance is calculated based on the control engine speed NEAST (for control use) defined for the CVT. In addition, this amount of assistance is corrected according to the usable zone with respect to the remaining battery charge SOC.

If the value of the scramble motor-assistance determining flag F_MASTSCR is 1, that is, when the scramble assistance is requested, the value of the scramble assistance flag F_SCRAST is set to 1.

In the next step S314, the WOT assistance calculating process is performed. In the process, the final WOT assistance command value WOTASTF is calculated as the amount of assistance used when the air-intake passage negative pressure PB is the critical point or higher. The amount of assistance is calculated based on the engine speed NE and the current value THEM of the degree of throttle opening TH. The amount of assistance is further corrected according to the usable zone of the remaining battery charge SOC.

In addition, when the value of the WOT motor-assistance determining flag F_MASTWOT is 1, that is, when the WOT assistance is requested, the value of the WOT assistance flag F_WOTAST is set to 1 under specific conditions, for example, based on the remaining battery charge SOC or the like.

In the following step S315, the ECO assistance calculating process is executed. The ECO assistance indicates the assistance performed when the load of the engine (i.e., internal combustion engine) is relatively low. In the ECO assistance calculating process, the ECO assistance command value ECOAST and the final ECO assistance command value ECOASTF is calculated as the amounts of assistance used in the ECO assistance.

The amounts of assistance are calculated based on the engine speed NE and the absolute value of the air-intake passage negative pressure PB. The amounts of assistance are corrected according to the usable zone of the remaining battery charge SOC.

In addition, if the vehicle is an MT vehicle and the value of the motor-assistance determining flag F_MASTPB with respect to the air-intake passage negative pressure is 1, or if the vehicle is a CVT vehicle and the value of the throttle motor-assistance determining flag F_MASTTH is 1, then the value of the ECO assistance flag F_ECOAST is set to 1 under specific conditions, for example, based on the remaining battery charge SOC or the like.

In the next step S316, it is determined whether any of (i) the starting assistance flag F_STRAST for commanding execution of the starting assistance, (ii) the scramble assistance flag F_SCRAST for commanding execution of the scramble assistance, (iii) the WOT assistance flag F_WOTAST for commanding execution of assistance in the above-explained WOT control, and (iv) the ECO assistance flag F_ECOAST for commanding execution of assistance in a low load state, has a value of 1.

If the result of the determination is "NO", the operation proceeds to step S317, where the value of the assistance execution permitting flag F_ANYAST is set to 0. This flag F_ANYAST is used for permitting any of the above-defined assistance operations (when the flag value is 1). The operation then proceeds to the above-explained step S310.

If the result of the determination of step S316 is "YES", the value of the assistance execution permitting flag F_ANYAST is set to 1, and the operation proceeds to step S319.

In step S319 in FIG. 7, it is determined whether the ECO assistance command value ECOAST is equal to or greater than the final WOT assistance command value WOTASTF. If the result of the determination is "YES", the operation proceeds to step S320. In step S320, the acceleration assistance command value ACCAST (i.e., assistance command value in the acceleration mode) is set to the final ECO assistance command value ECOASTF, and the operation proceeds to step S321. In step S321, the assistance mode set value ASTMOD is set to a value indicating the ECO assistance in which the output of the engine E is assisted in a low load state. The operation then proceeds to step S324 (explained below).

If the result of the determination of step S319 is "NO", the operation proceeds to step S322, where the acceleration assistance command value ACCAST is set to the final WOT assistance command value WOTASTF. The operation then proceeds to step S323, where the assistance mode set value ASTMOD is set to a value indicating the WOT assistance in which the output of the engine E is assisted in the above-explained WOT control. The operation then proceeds to step S324.

In step S324, it is determined whether the acceleration assistance command value ACCAST is equal to or higher than the final starting assistance command value STRASTF. If the result of the determination is "YES", the operation proceeds to step S327 (explained below). If the result of the determination is "NO", the operation proceeds to step S325, where the acceleration assistance command value ACCAST is set to the final starting assistance command value STRASTF, and the operation proceeds to step S326. In step S326, the assistance mode set value ASTMOD is set to a value indicating the starting assistance in which the output of the engine E is assisted when the vehicle is started. The operation then proceeds to step S327.

In step S327, it is determined whether the acceleration assistance command value ACCAST is equal to or higher than the final scramble assistance command value SCRASTF. If the result of the determination is "YES", the operation proceeds to step S330 (explained below). If the result of the determination is "NO", the operation proceeds to step S328, where the acceleration assistance command value ACCAST is set to the final scramble assistance command value SCRASTF, and the operation proceeds to step S329. In step S329, the assistance mode set value ASTMOD is set to a value indicating the scramble assistance in which the output of the engine F is temporarily assisted while the vehicle is accelerated under specific conditions. The operation then proceeds to step S330.

In step S330, the system state set value SYSMOD, which is used for setting the state of the system, is set to the assistance mode set value ASTMOD.

In step S331 in FIG. 8, it is determined whether the previous assistance mode set value ASTMOD1, which was set when the process was executed last time, equals the current assistance mode set value ASTMOD. If the result of the determination is "NO", the operation proceeds to step S335 (explained below). If the result of the determination is "YES", the operation proceeds to step S332, where it is determined whether the value of the assistance mode change flag F_ASTMODC, which is used for designating whether the mode should be changed, is 1.

If the result of the determination in step S332 is "YES", the operation proceeds to step S335, while if the result of the determination is "NO", the operation proceeds to step S333.

In step S333, the final acceleration assistance command value ACCASTF is set to the acceleration assistance command value ACCAST.

In the next step S334, the (previous) assistance mode set value ASTMOD1 is set to the assistance mode set value ASTMOD, and the operation proceeds to step S340 (explained below).

Step 335 is performed when the current assistance mode set value ASTMOD differs from the previous assistance mode set value ASTMOD1, or when the value of the assistance mode change flag F_ASTMODC is 1. In this step S335, it is determined whether the final acceleration assistance command value ACCASTF is equal to or less than the acceleration assistance command value ACCAST.

If the result of the determination is "YES", that is, when the acceleration assistance command value ACCAST, which has been set this time, is equal to or greater than the final acceleration assistance command value ACCASTF, which was set last time (i.e., when the process was performed last time), then the operation proceeds to step S336. In step S336, the value of the assistance mode change flag F_ASTMODC is set to 0, and the operation proceeds to the above-explained step S333.

If the result of the determination in step S335 is "NO", that is, when the acceleration assistance command value ACCAST is less than the previous final acceleration assistance command value ACCASTF, the operation proceeds to step S337. In step S337, the value of the assistance mode change flag F_ASTMODC is set to 1, and the operation proceeds to step S338.

In step S338, the final acceleration assistance command value ACCASTF is set to a value obtained by subtracting the predetermined assistance command subtraction value #DACCASTM from the final acceleration assistance command value ACCASTF (which was set when the process was executed last time). The operation then proceeds to step S339.

In step S339, it is determined whether the final acceleration assistance command value ACCASTF is equal to or less than the acceleration assistance command value ACCAST. If the result of the determination is "YES", that is, when the final acceleration assistance command value ACCASTF, which has been gradually decreased, has reached the acceleration assistance command value ACCAST, the operation proceeds to the above-explained step S336. If the result of the determination of step S339 is "NO", the operation proceeds to the above-explained step S334.

That is, when the assistance mode is changed, in particular, if the amount of assistance is decreased in comparison with the amount of assistance in the last operation (i.e., when the process was executed last time), then the amount of assistance is gradually decreased using the predetermined assistance command subtraction value #DACCASTM. Accordingly, even when the assistance mode is changed, it is possible to prevent the passengers of the vehicle from feeling a sudden change in acceleration, thereby realizing smooth accelerating performance.

In step S340, the final assistance command value ASTPWRF is set to the final acceleration assistance command value ACCASTF.

In the S341, the assistance upper-limit value ASTVHG is set to the assistance upper-limit value #ASTVHG retrieved from a data table which stores assistance upper-limit values #ASTVHG in correspondence to different vehicle speeds VP. That is, the assistance upper-limit value ASTVHG depends on the vehicle speed VP.

In step S342, it is determined whether the final assistance command value ASTPWRF is equal to or greater than the assistance upper-limit value ASTVHG. If the result of the determination is "NO", the process of this flow is terminated. If the result of the determination of step S342 is "YES", the operation proceeds to step S343, where the final assistance command value ASTPWRF is set to the assistance upper-limit value ASTVHG, and the process is completed.

According to the motor output control system for hybrid vehicles of the present invention, the amount of power assistance can be gradually changed when the assistance mode is switched, for example:

(i) when the acceleration is performed after the mode is switched to the ECO assistance mode, in which output assistance is performed in a low load state of the engine E, or to the WOT assistance mode, in which output assistance is performed in a high load state of the engine E, after the starting assistance mode (in which the output assistance is performed when the vehicle is started) is terminated, or (ii) when acceleration is performed by switching the acceleration mode to the ECO or WOT assistance mode after termination of the scramble assistance mode in which the output assistance is temporarily performed when the vehicle is suddenly accelerated.

Therefore, when the assistance mode is changed, in particular, if the amount of assistance is decreased in comparison with the amount of assistance in the last operation, the amount of assistance is gradually decreased using the predetermined assistance command subtraction value #DACCASTM. Accordingly, even when the assistance mode is changed, it is possible to prevent the passengers of the vehicle from feeling a sudden change in acceleration and to realize smooth accelerating and driving performance.

What is claimed is:

1. A motor output control system built in a hybrid vehicle which comprises an internal combustion engine and a motor as driving sources and in which the output of the internal combustion engine is assisted using the motor according to the driving state of the vehicle, the system comprising:

an assistance mode determination section for determining whether the output assistance using the motor is permitted with respect to each of different control modes for the output assistance, where the determination is performed according to the driving state of the vehicle;

an amount of assistance calculating section for calculating an amount of output assistance for each of the different control modes;

an assistance permitting section for permitting the output assistance using the motor when the output assistance is permitted in any control mode according to the determination of the assistance mode determination section;

an amount of assistance selecting section for selecting the maximum amount of assistance among the amounts of assistance, which are calculated by the amount of assistance calculating section and are assigned to the different control modes, when the output assistance using the motor is permitted by the assistance permitting section; and a mode shift section for:
  comparing a previous value of the maximum amount of assistance, selected by the amount of assistance selecting section last time, with the current value of the maximum amount of assistance selected this time;
  calculating a shift value obtained by subtracting a predetermined assistance value from the previous value when the current value is less than the previous value; and
  setting the amount of assistance using the motor to the shift value until the shift value becomes equal to or less than the current value, so as to gradually shift the amount of assistance from the previous value to the current value.

2. A motor output control system as claimed in claim 1, wherein the assistance permitting section includes the assistance mode determination section.

3. A motor output control system as claimed in claim 1, wherein the control modes for the output assistance using the motor include at least:

a starting assistance mode for performing the output assistance when the vehicle is started;

a sudden acceleration assistance mode for performing the output assistance when the vehicle is suddenly accelerated;

a low load assistance mode for performing the output assistance when the load of the internal combustion engine is low; and a high load assistance mode for performing the output assistance when the load of the internal combustion engine is high.

4. A motor output control method used for a hybrid vehicle which comprises an internal combustion engine and a motor as driving sources and in which the output of the internal combustion engine is assisted using the motor according to the driving state of the vehicle, the method comprising:

an assistance mode determination step of determining whether the output assistance using the motor is permitted with respect to each of different control modes for the output assistance, where the determination is performed according to the driving state of the vehicle;

an amount of assistance calculating step of calculating an amount of output assistance for each of the different control modes;

an assistance permitting step of permitting the output assistance using the motor when the output assistance is permitted in any control mode according to the determination in the assistance mode determination step;

an amount of assistance selecting step of selecting the maximum amount of assistance among the amounts of assistance, which are calculated in the amount of assistance calculating step and are assigned to the different control modes, when the output assistance using the motor is permitted in the assistance permitting step; and a mode shift step of:
  comparing a previous value of the maximum amount of assistance, selected in the amount of assistance selecting step last time, with the current value of the maximum amount of assistance selected this time;
  calculating a shift value obtained by subtracting a predetermined assistance value from the previous value when the current value is less than the previous value; and
  setting the amount of assistance using the motor to the shift value until the shift value becomes equal to or less than the current value, so as to gradually shift the amount of assistance from the previous value to the current value.

5. A motor output control method as claimed in claim 4, wherein the control modes for the output assistance using the motor include at least:

a starting assistance mode for performing the output assistance when the vehicle is started;

a sudden acceleration assistance mode for performing the output assistance when the vehicle is suddenly accelerated;

a low load assistance mode for performing the output assistance when the load of the internal combustion engine is low; and a high load assistance mode for performing the output assistance when the load of the internal combustion engine is high.

* * * * *